United States Patent [19]

Clark et al.

[11] Patent Number: 5,035,870

[45] Date of Patent: Jul. 30, 1991

[54] CRYSTALLINE ALUMINOPHOSPHATE COMPOSITIONS

[75] Inventors: David M. Clark; Ronald J. Dogterom, both of Amsterdam, Netherlands

[73] Assignee: Shell Oil Company, Houston, Tex.

[21] Appl. No.: 523,513

[22] Filed: May 15, 1990

[30] Foreign Application Priority Data

Sep. 15, 1989 [GB] United Kingdom ............... 8920906

[51] Int. Cl.$^5$ ..................... C01B 35/12; C01B 25/36; B01J 27/18
[52] U.S. Cl. .................................. 423/277; 423/305; 423/306; 502/208; 502/209; 502/210; 502/213; 502/214; 208/46
[58] Field of Search ............... 423/277, 279, 305, 306, 423/326, 328, 329; 502/214, 208–213; 208/46

[56] References Cited

U.S. PATENT DOCUMENTS 4,310,440 1/1982 Wilson ........................... 423/305

Primary Examiner—R. Bruce Breneman

[57] ABSTRACT

Crystalline aluminophosphates and related compounds having in the as-synthesized anhydrous form the chemical composition: $m'R(X_nAl_qP_x)O_2$, wherein R is derived from a 2,2'-bipyridyl moiety, X represents one or more elements which can be substituted for Al and/or P, wherein $m' = 0.01 - 0.33$
$n = 0 - 0.40$
$q = 0.30 - 0.60$
$x = 0.30 - 0.60$ and wherein $n + q + x = 1$.

24 Claims, No Drawings

CRYSTALLINE ALUMINOPHOSPHATE COMPOSITIONS

FIELD OF THE INVENTION

The present invention relates to novel crystalline aluminophosphate compositions and a process for preparing such aluminophosphates.

BACKGROUND OF THE INVENTION

Crystalline aluminophosphate compositions are well known materials which find a promising reception in industry as new generations of molecular sieves, catalyst carriers as well as catalysts. For instance, in U.S. Pat. No. 4,310,440 the preparation of various crystalline aluminophosphates is described from reaction mixtures containing inter alia organic templating agents including tetrapropylammonium hydroxide, quinuclidine, t-butylamine and ethylenediamine.

Classes of these materials comprise compsitions crystallized in the $AlPO_4$, $SAPO_4$ (silicoaluminophosphate), $MeAPO_4$ (metalloaluminophosphate) and $ElAPO_4$ (non-metal substituted aluminophosphate) families.

It has now been found that novel crystalline aluminophosphates and related compounds, e.g. of the $AlPO_4$-, $SAPO_4$- and $MeAPO_4$-type can be prepared from reaction gels or solutions when use is made of the appropriate forming components and a 2,2'-bipyridyl compound.

SUMMARY OF THE INVENTION

The present invention relates to crystalline aluminophosphates and related compounds having in the as-synthesized anhydrous form the chemical composition: $m'R(X_nAl_qP_x)O_2$, wherein R is derived from a 2,2'-bipyridyl moiety, X represents one or more elements which can be substituted for Al and/or P, wherein $m' = 0.01 - 0.33$
$n = 0 - 0.40$
$q = 0.30 - 0.60$
$x = 0.30 - 0.60$ wherein $n + q + x = 1$,
and having an X-ray diffraction pattern containing at least the following lines:

TABLE 1

| d (A) | Intensity |
| --- | --- |
| 8.3–8.7 | m |
| 7.2–7.4 | w |
| 7.0–7.2 | m/s |
| 5.1–5.3 | w |
| 5.0–5.2 | vw/w |
| 4.16–4.26 | w/m |
| 4.13–4.23 | m/s |
| 4.08–4.18 | w/m |
| 3.97–4.07 | w/m |
| 3.92–4.02 | m |
| 3.60–3.70 | vs |
| 3.24–3.30 | m |
| 2.90–2.96 | w |
| 2.73–2.79 | vw/w |

In particular the present invention relates to crystalline aluminophosphates and related compounds having the chemical composition as described above, wherein $m' = 0.10 - 0.20$
$n = 0 - 0.30$
$q = 0.44 - 0.60$ and
$x = 0.44 - 0.60$ and wherein $n + q + x = 1$.

DESCRIPTION OF THE PREFERRED EMBODIMENTS

Particularly preferred to be present in a crystalline compound according to the invention, are compounds derived from a 2,2'-bipyridyl moiety containing one or more alkyl groups, specifically alkyl groups comprising not more than 6 carbon atoms, more specifically alkyl groups representing methyl, ethyl and/or propyl. Especially preferred are compounds which are derived from a 2,2'-bipyridyl moiety made up of two similarly substituted pyridyl groups, more specifically compounds which are derived from 4,4'-dimethyl 2,2'-bipyridyl or 2,2'-bipyridyl.

Suitable elements which can be substituted for aluminum and/or phosphorus in the crystalline aluminophosphates and related compounds according to the present invention include one or more of beryllium, magnesium, titanium, manganese, iron, cobalt, zinc, vanadium, nickel, chromium, silicon, lithium, boron, gallium, germanium and arsenic. Typically, said element will be once or more of magnesium, titanium, manganese, iron, cobalt, zinc, nickel, silicon, gallium or germanium, and preferably one or more of magnesium, manganese, titanium, iron, cobalt and silicon.

In the event that $n > 0$ it will be appreciated that the as-synthesized anhydrous form also contains an appropriate charge-balancing cation such as a proton, or a protonated form of a compound based on R.

An example of a novel crystalline aluminophosphate according to the present invention and belonging to the $AlPO_4$-class has in the as synthesized form the following chemical composition, wherein R represents a compound derived from 2,2'-bipyridyl:

$0.13 \ R(Al_{0.5}P_{0.5})O_2$ having an X-ray diffraction pattern containing at least the lines as given in Table 2.

A further example of a novel crystalline aluminophosphate according to the present invention and belonging to the $SAPO_4$-class has in the as-synthesized form the following chemical composition:

$0.12 \ R(Si_{0.07}Al_{0.49}P_{0.44})O_2$ having an X-ray diffraction pattern containing at least the lines as given in Table 2.

A further example of a novel crystalline aluminophosphate according to the present invention and belonging to the $CoAlPO_4$-class has in the as-synthesized form the following chemical composition:

$0.12 \ R(Co_{0.04}Al_{0.47}P_{0.49})O_2$ having an X-ray diffraction pattern containing at least the lines as given in Table 2.

It should be understood that the anhydrous form referred to in this specification may also contain chemically bound water.

The present invention also relates to novel crystalline aluminophosphates and related compounds which are substantially in the calcined, R-free form having the general chemical composition:

$(X_nAl_qP_x)O_2$, wherein X, n, q and x have the meaning as described hereinabove and wherein $n + q + x = 1$.

The invention also relates to a process for preparing novel crystalline aluminophosphates as well as related compounds as defined hereinbefore, from a forming solution or gel comprising a source of aluminium, a source of phosphorus, optionally a source of at least one component X, and a template source based on a 2,2'-bipyridyl moiety, which mixture is kept at elevated temperature for a period of time sufficient to produce a crystalline aluminophosphate or related compound followed by separating off the crystalline product obtained and drying, in which solution or gel the various components are initially present in the following molar ratios:

$R : Al_2O_3 = 0.1 - 3$
$X : Al_2O_3 = 0 - 2$
$P : Al_2O_3 = 0.3 - 1.3$
$H_2O : Al_2O_3 = 40 - 500$

The crystalline aluminophosphates and related compounds according to the present invention are preferably prepared from a forming solution or gel in which the various components are initially present in the following molar ratios:

$R : Al_2O_3 = 0.15 - 2$
$X : Al_2O_3 = 0 - 2$
$P : Al_2O_3 = 0.4 - 1.25$
$H_2O : Al_2O_3 = 45 - 320$

Crystalline aluminophosphates and related compounds having in the as-synthesized anhydrous form an X-ray diffraction pattern containing at least the lines as given in Table 1 are suitably prepared while keeping the temperature between 80° C. and 220° C., in particular at a temperature in the range of from 100° C. to 200° C.

The use of aqueous forming solutions or gels is preferred.

For preparing the forming solution or gel, any source or promoter form based on a 2,2'-bipyridyl moiety can be used as template source, such as a quaternary compound of such a 2,2'-bipyridyl moiety, which source or promoter form should be such that it can be converted into a 2,2'-bipyridyl moiety.

The process according to the present invention can be carried out at autogeneous pressure as well as at elevated pressure. Normally, the novel crystalline aluminophosphates and related compounds will be produced when the forming solution or gel has been kept under the appropriate conditions for a period of time allowing the proper structure to be formed.

Preferably, the process according to the present invention is carried out for a period of time ranging between 18 and 144 hours, in particular between 24 and 96 hours.

Examples of suitable aluminum sources comprise aluminum oxide and/or derivatives thereof, such as boehmite, pseudo-boehmite or aluminum alkoxides and mixtures of various aluminum sources. An especially preferred aluminum source is boehmite.

Suitable phosphorus sources comprise phosphorus acids and derivatives thereof such as esters, phosphorus oxides, phosphates and phosphites, preferably orthophosphoric acid and mixtures of various phosphorus sources.

Examples of suitable sources of X comprise the appropriate chlorides, iodides, bromides, nitrates, sulfates and acetates, preferably acetates as well as oxides.

If desired, the crystalline aluminophosphates and related compounds produced can be calcined after drying to aluminophosphates and related compounds.

It has been found that agitation can be applied advantageously to produce the desired crystalline aluminophosphates or related compounds from the forming solution or gel.

The novel crystalline aluminophosphates and related compounds according to the present invention can suitably be used as molecular sieves, catalysts or as catalyst carriers in the operation of various catalytic processes.

If desired, one or more (catalytically) active species, in particular one or more compounds of metals of Group IIIA, IVB, VIII or rare earth metals and/or precursors thereof, can be incorporated into the crystalline aluminophosphates and related compounds according to the present invention.

They can be incorporated by well-known techniques such as, for instance, impregnation and ion-exchange.

The invention will now be described by means of the following Examples which are intended to be illustrative and are not to be construed as limiting the invention.

EXAMPLE 1

A crystalline $AlPO_4$, referred to as SCS-14, was prepared by mixing 13.75 grams of boehmite, 23.1 grams of 85% $H_3PO_4$, 15.6 grams of 2,2'-bipyridyl (bipy) and 68.6 grams of water giving a reaction gel mixture on a molar basis of 1 $Al_2O_3$ : 1 $P_2O_5$ : 1 bipy : 45 $H_2O$.

This mixture was kept at 160° C. for a period of 72 hours until a crystalline compound was obtained.

After synthesis the crystalline compound produced was separated from the reaction mixture by filtration, water washed and dried at 120° C.

The crystalline compound obtained had in the anhydrous form the following chemical composition, wherein R represents a compound derived from 2,2'-bipyridyl:

0.13 $R(Al_{0.5}P_{0.5})O_2$ having an X-ray diffraction pattern containing at least the lines as given in Table 2, below.

TABLE 2

| d (A) | Intensity |
|---|---|
| 8.5 | m |
| 7.3 (sh) | w |
| 7.1 | m/s |
| 5.2 | w |
| 5.1 | vw/w |
| 4.21 (sh) | w/m |
| 4.18 | m/s |
| 4.13 (sh) | w/m |
| 4.02 | w/m |
| 3.97 | m |
| 3.65 | vs |
| 3.27 | m |
| 2.93 | w |
| 2.76 | vw/w |

EXAMPLE 2

A crystalline $SAPO_4$ was prepared by mixing 3.4 grams of boehmite, 5.2 grams of 85% $H_3PO_4$, 3.9 grams of 2,2'-bipyridyl (bipy), 1.2 grams of silicasol (Ludox, s.a.) and 21.4 grams of water, giving a reaction gel mixture on a molar basis of 0.3 $SiO_2$: 1 $Al_2O_3$ : 0.9 $P_2O_5$ : 1 bipy : 56 $H_2O$. This mixture was kept at 160° C. for a period of 72 hours until a crystalline compound was obtained.

After synthesis the crystalline compound produced was separated from the reaction mixture by filtration, water washed and dried at 120° C.

The crystalline compound obtained has in the anhydrous form the following chemical composition, wherein R represents a compound derived from 2,2'-bipyridyl:

0.12 $R(Si_{0.07}Al_{0.49}P_{0.44})O_2$ having an X-ray diffraction pattern containing at least the lines as given in Table 2.

EXAMPLE 3

A crystalline $CoAlPO_4$ was prepared by mixing 3.1 grams of boehmite, 5.8 grams of 85% $H_3PO_4$, 3.9 grams of 2,2'-bipyridyl (bipy), 2.2 grams of Co(CH$_3$COO)$_2$.4-H$_2$O and 19.2 grams of water, giving a reaction gel mixture on a molar basis of 0.3 CoO : 0.9 Al$_2$O$_3$ : 1 P$_2$O$_5$ : 1 bipy : 50.5 H$_2$O.

This mixture was kept at 160° C. for 72 hours until a crystalline compound was obtained.

After synthesis the crystalline compound produced was separated from the reaction mixture by filtration, water washed and dried at 120° C.

The crystalline compound obtained has in the anhydrous form the following chemical composition, wherein R represents a compound derived from 2,2'-bipyridyl:

0.12 R(Co$_{0.04}$Al$_{0.47}$P$_{0.49}$)O$_2$ having an X-ray diffraction pattern containing at least the lines as given in Table 2.

What is claimed is:

1. Crystalline aluminophosphates comprising in an as-synthesized anhydrous form a chemical composition: m'R(X$_n$Al$_q$P$_x$)O$_2$, wherein R is derived from a 2,2'-bipyridyl moiety, X represents one or more elements which can be substituted for Al and/or P and is selected from the group consisting of beryllium, magnesium, titanium, manganese, iron, cobalt, zinc, vanadium, nickel, chromium, silicon, boron, gallium, germanium, arsenic and mixtures thereof, wherein m' = 0.01 − 0.33
n = 0 − 0.40
q = 0.30 − 0.60
x = 0.30 − 0.60 and wherein n + q + x = 1, and having an X-ray diffraction pattern containing at least the following lines:

| d(A) | Intensity |
|---|---|
| 8.3–8.7 | m |
| 7.2–7.4 | w |
| 7.0–7.2 | m/s |
| 5.1–5.3 | w |
| 5.0–5.2 | vw/w |
| 4.16–4.26 | w/m |
| 4.13–4.23 | m/s |
| 4.08–4.18 | w/m |
| 3.97–4.07 | w/m |
| 3.92–4.02 | m |
| 3.60–3.70 | vs |
| 3.24–3.30 | m |
| 2.90–2.96 | w |
| 2.73–2.79 | vw/w |

2. The crystalline aluminophosphates of claim 1, wherein m' = 0.10 − 0.20
n = 0 − 0.30
q = 0.44 − 0.60 and
x = 0.44 − 0.60.

3. The crystalline aluminophosphates of claim 1 wherein R is derived from a 2,2'-bipyridyl moiety containing at least one alkyl group.

4. The crystalline aluminophosphates of claim 3 wherein said alkyl group comprises no more than 6 carbon atoms.

5. The crystalline aluminophosphates of claim 4 wherein said alkyl group is selected from the group consisting of a methyl group, an ethyl group, a propyl group and mixtures thereof.

6. The crystalline aluminophosphates of claim 1 wherein R is derived from a 2,2'-bipyridyl moiety comprising two similarly substituted pyridyl-groups.

7. The crystalline aluminophosphates of claim 6 wherein R is derived from 4,4'-dimethyl 2,2'-bipyridyl.

8. The crystalline aluminophosphates of claim 1 wherein element X is selected from the group consisting of magnesium, manganese, titanium, iron, cobalt, silicon and mixtures thereof.

9. The crystalline aluminophosphates of claim 1 wherein said crystalline aluminophosphates additionally contain one or more catalytically active compounds.

10. The crystalline aluminophosphates of claim 9 wherein the catalytically active compound comprises at least one metal selected from the group consisting of Group IIIA, Group VIB, Group VIII and rare earth materials.

11. A process for preparing crystalline aluminophosphates comprising in an as-synthesized anhydrous form a chemical composition: m'R(X$_n$Al$_q$P$_x$)O$_2$, wherein R is derived from a 2,2'-bipyridyl moiety, X represents one or more elements which can be substituted for Al and/or P, and is selected from the group consisting of beryllium, magnesium, titanium, manganese, iron, cobalt, zinc, vanadium, nickel, chromium, silicon, lithium, boron, gallium, germanium, arsenic and mixtures thereof, wherein m' = 0.01 − 0.33
n = 0 − 0.40
q = 0.30 − 0.60
x = 0.30 − 0.60 and wherein n + q + x = 1,
and having an X-ray diffraction pattern containing at least the following lines:

| d(A) | Intensity |
|---|---|
| 8.3–8.7 | m |
| 7.2–7.4 | w |
| 7.0–7.2 | m/s |
| 5.1–5.3 | w |
| 5.0–5.2 | vw/w |
| 4.16–4.26 | w/m |
| 4.13–4.23 | m/s |
| 4.08–4.18 | w/m |
| 3.97–4.07 | w/m |
| 3.92–4.02 | m |
| 3.60–3.70 | vs |
| 3.24–3.30 | m |
| 2.90–2.96 | w |
| 2.73–2.79 | vw/w | from a forming solution or gel which comprises mixing a source of aluminum, a source of phosphorous, and a template source based on a 2,2'-bipyridyl moiety, which mixture is kept at a temperature in the range of from about 80° C. to about 220° C. for a period of time sufficient to produce a crystalline aluminophosphate followed by separating off the crystalline product obtained and then drying, wherein said solution or gel has various components present in the following molar ratios:

R:Al$_2$O$_3$ = 0.1 − 3
X:Al$_2$O$_3$ = 0 − 2
P:Al$_2$O$_3$ = 0.3 − 1.3
H$_2$O:Al$_2$O$_3$ = 40 − 500.

12. The process of claim 11 wherein the various components in the forming solution or gel are initially present in the following molar ratios:

R:Al$_2$O$_3$ = 0.15 − 2
X:Al$_2$O$_3$ = 0 − 2
P:Al$_2$O$_3$ = 0.4 − 1.25
H$_2$O:Al$_2$O$_3$ = 45 − 320.

13. The process of claim 11 wherein said source of aluminum is selected from the group consisting of aluminum oxides and derivates thereof.

14. The process of claim 13 wherein said source of aluminum is boehmite.

15. The process of claim 11 wherein said source of phosphorus is selected from the group consisting of phosphorus acids, phosphorus oxides, phosphates, phosphites and mixtures thereof.

16. The process of claim 11 wherein said template source is based on a 2,2'-bipyridyl moiety containing at least one alkyl group.

17. The process of claim 16 wherein said alkyl group comprises no more than 6 carbon atoms.

18. The process of claim 17 wherein said alkyl group is selected from the group consisting of a methyl group, an ethyl group, a propyl group and mixtures thereof.

19. The process of claim 16 wherein said template source is based on a 2,2'-bipyridyl moiety comprises two similarly substituted pyridyl-groups.

20. The process of claim 19 wherein said template source 4,4'-dimethyl 2,2'-bipyridyl.

21. The process of claim 11 wherein said forming solution or gel additionally comprises at least one source of component X.

22. The process of claim 24 wherein said source of component X is selected from the group consisting of chloride, iodide, bromide, sulfate, nitrate, acetate, oxide and mixtures thereof.

23. The process of claim 11 wherein the forming solution or gel is kept for a period of time ranging between 18 and 144 hours under crystal-forming conditions.

24. The process of claim 11 wherein the crystalline product obtained is calcined.

* * * * *